United States Patent [19]

Munter

[11] 4,254,496
[45] Mar. 3, 1981

[54] DIGITAL COMMUNICATION BUS SYSTEM

[75] Inventor: Ernst A. Munter, Ottawa, Canada

[73] Assignee: Northern Telecom Limited, Montreal, Canada

[21] Appl. No.: 52,954

[22] Filed: Jun. 28, 1979

[51] Int. Cl.³ .............................................. H04J 3/14
[52] U.S. Cl. ........................................ 370/16; 370/85
[58] Field of Search ....................... 370/16, 13, 67, 58, 370/85

[56] References Cited

U.S. PATENT DOCUMENTS

| | | | |
|---|---|---|---|
| 3,603,736 | 9/1971 | Morroll | 370/16 |
| 3,940,566 | 2/1976 | Jeppsson et al. | 370/16 |
| 4,144,407 | 3/1979 | Zaffignani et al. | 370/16 |

FOREIGN PATENT DOCUMENTS

| | | | |
|---|---|---|---|
| 2540577 | 3/1977 | Fed. Rep. of Germany | 370/16 |
| 1310772 | 3/1973 | United Kingdom | 370/67 |

Primary Examiner—Douglas W. Olms
Attorney, Agent, or Firm—John E. Mowle

[57] ABSTRACT

A digital bus system for the transmission of pulse code modulated speech and control data between a common multiplexer and a multiplicity of line circuits in a telecommunications system. In the past the line circuits were multiplexed directly onto a common bus so that failure of one line circuit could result in the balance of the line circuits on that bus being rendered unserviceable. In the present system each line circuit is coupled over a separate data line to a pair of multiplexers so that failure of any one line circuit does not affect the operation of the others. Under normal operation one of the multiplexers functions as the primary and the other as a secondary. However, should the primary multiplexer fail, the secondary will take over upon actuation of a single control signal from a controller.

4 Claims, 3 Drawing Figures

DIGITAL COMMUNICATION BUS SYSTEM

This invention relates to a digital bus system which is particularly suited for the transmission of pulse code modulated speech and control data between a common multiplex and control circuit on one hand, and a multiplicity of individual line interface circuits on the other.

BACKGROUND OF THE INVENTION

In telecommunication switching systems utilizing digital transmission, it is common practice to multiplex a plurality of PCM encoded analog speech signals onto a common data transmission path. The PCM encoded signals are coupled through the digital switching system where they are distributed in accordance with address control information. Due to the high reliability requirements of such systems, it is also common practice to duplicate all major networks of the system or to provide sufficient capacity that should one section fail another can take over with the only penalty being some loss of access to the system during busy periods.

In the past, time division multiplexed PCM (pulse-code-modulation) data has been distributed from the switching system to a plurality of line circuits over a common bus system utilizing address control to access each line circuit during its assigned time slot. A major weakness of such a system is that should the input to one of the line circuits develop a short circuit, the whole bus including the balance of the line circuits connected to it, is rendered unserviceable even though redundant components feeding the bus system have been provided.

STATEMENT OF THE INVENTION

This disadvantage of the prior systems has been overcome in the present invention by providing a bus system in which a separate single data line is established between each line circuit and a pair of multiplexers, either one of which may alternately access each of the data lines. The multiplexers in turn are alternately actuated by a single gate so that only failure of this gate in a particular mode would inhibit both multiplexers. All communications between the multiplexers and the line circuits are carried over these single data lines so that should one fail only the associated line circuit will be rendered unserviceable. In addition, a single clock signal is distributed on a common bus to all line circuits with sufficient isolation that failure of a line circuit will not affect the clock signal coupled to the balance of the circuits. No other synchronization or timing leads are used.

Thus, in accordance with the present invention there is provided a digital communication bus system comprising first and second multiplexers. Each of the multiplexers includes means for decoding consecutive time division multiplexed addresses received over an address bus and for receiving and transmitting time-division multiplexed data over respective receive and transmit signal data paths in corresponding iterated time slots of each frame. The system also includes a plurality of line circuits, each of which couples the information from at least one individual telephone line to a single bidirectional data line that is connected in common to both multiplexers. Each of the multiplexers includes means responsive to each decoded address for steering data received over the receive data path to the associated line circuit over its single bidirectional data line; and for steering data received from the associated line circuit over its single data line to the transmit data path in the two time slots succeeding its address. In addition, this system includes means responsive to a control signal for actuating one or the other of the first or second multiplexers.

With such a system, the single data line would sequentially carry all control, PCM, supervision and status information data in both directions, between the multiplexer and the line circuit. The system utilizes a minimum number of leads coupled between each line circuit and the multiplexers which helps to avoid manufacturing problems should a large number of line circuits be mounted in a small space. The system also provides complete redundancy of other components for reliability. With this system, failure of one line circuit will not affect operation of the bus to the other line circuits.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
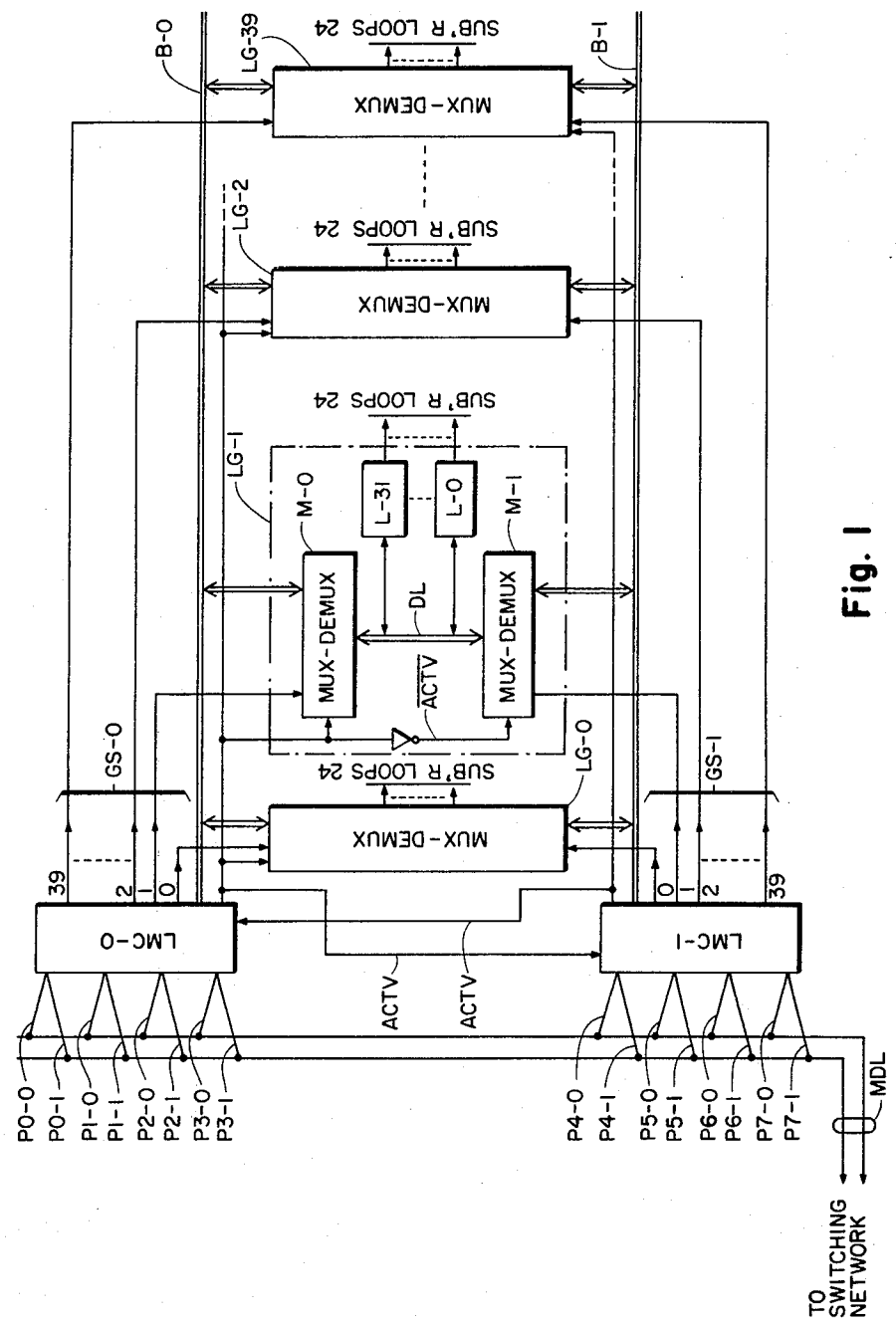
FIG. 1 is a block schematic diagram of the overall bus system for a line module using duplicated controllers with a number of line-group networks.

Many of the elements illustrated in the drawings are duplicates of each other. In general, only one such element will be illustrated in detail while all the others will be shown in block form. Where a plurality of elements are used, each will be given a base reference character followed by a -number. A common practice of assigning zero to the initial unit of each series will be followed. Thus, where 40 units are utilized, they will be identified as -0 through -39.

Referring to FIG. 1, the system comprises a group of 40 line-group networks LG-0 through LG-39 each of which includes a pair of multiplexers M-0 and M-1 and a plurality of 32 line circuits L-0 through L-31. The multiplexers M-0 and M-1 in turn are connected to the respective line-module controllers LMC-0 and LMC-1 through common buses B-0 and B-1 and 40 individual group select leads GS-0 and GS-39. The duplicated line module controllers LMC-0 and LMC-1 are connected to a central switching network (not shown) through four duplicated input ports P0-0 through P3-1, and P4-0 through P7-1 respectively, via dual multiple data links MDL. Each input port P0-0 through P7-1 has a capacity of 30 input channels in 32 time slots allowing two time slots for supervision and control. Under normal operation, each controller functions as the primary controller for one-half the line-group networks and hence accesses one-half the 1280 (32×40) line circuits. Normally therefore, 640 line circuits have access to 120 (4×30) channels in the switching network through each controller. However, should one primary controller LMC-0 or LMC-1 or any one of its associated operating multiplexers M-0 or M-1 be rendered unserviceable, the other controller functioning as a secondary to it, will take over control of all 1280 line circuits. Since all 1280 line circuits must now share the 120 rather than 240 available channels, access to the switching system may be affected during peak traffic periods.

The function of each of the controllers LMC-0 and LMC-1 includes scanning for originating calls, collecting digits, assigning channels to lines, controlling application of ringing signals or tones to the lines, and communicating with the central control computer in the switching network via at least some of the message channels in the two time slots allotted for supervision and control.

Figure 2:
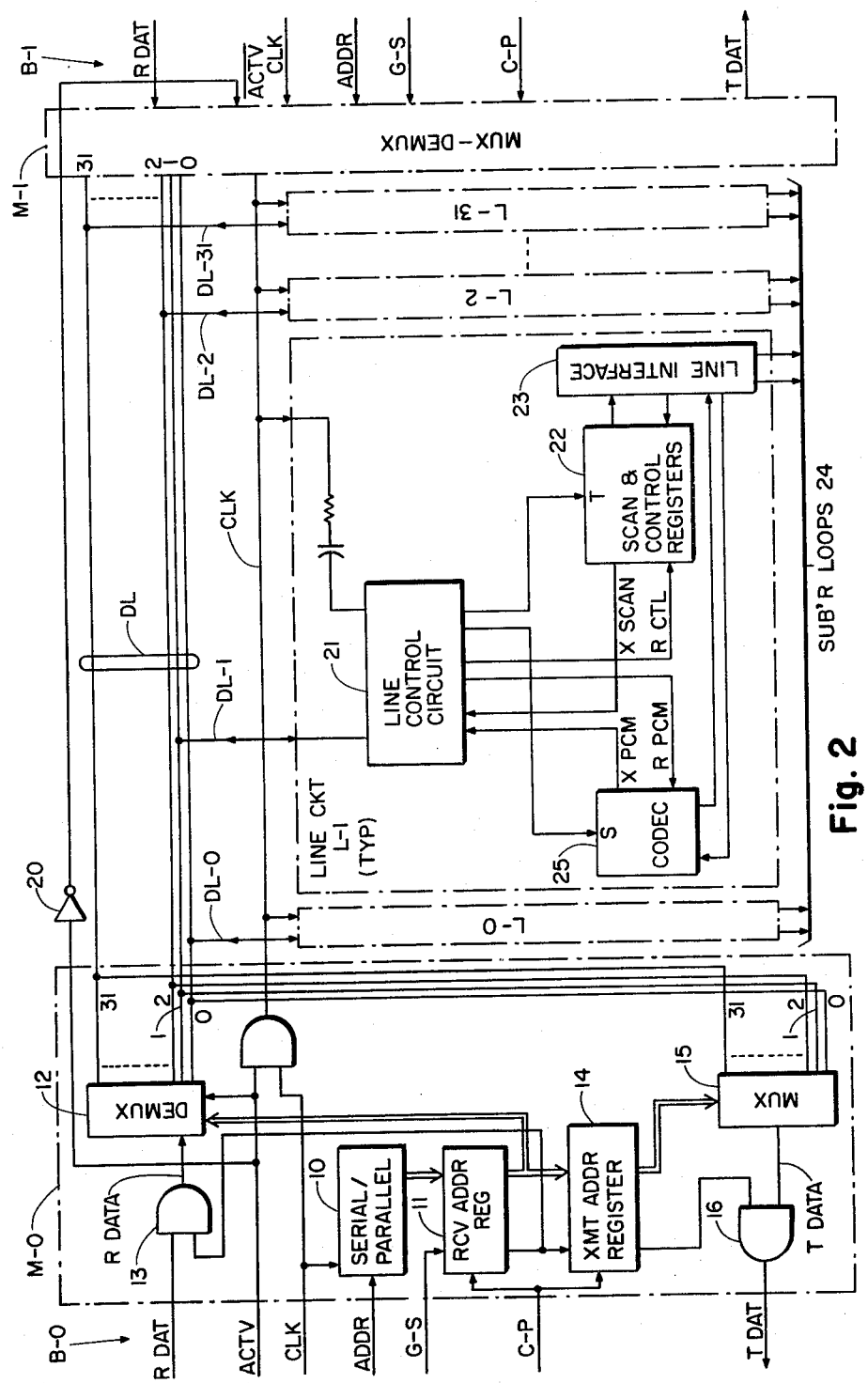
FIG. 2 illustrates in greater detail one of the line-group networks of FIG. 1 showing the interconnection of multiple line circuits with two multiplexers.

Referring to both FIGS. 1 and 2, each of the 40 line-group networks comprises the pair of multiplexers M-0 and M-1 which are coupled to their respective controllers through buses B-0 and B-1, except for the activity control signal ACTV which is coupled to only the primary controller LMC-0 over bus B-0 (in this embodiment). Each of the line circuits L-0 through L-31 couples the subscriber loops 24 to the 32 separate bidirectional data lines DL-0 to DL-31 which in turn are connected in common to both multiplexers M-0 and M-1.

Figure 3:
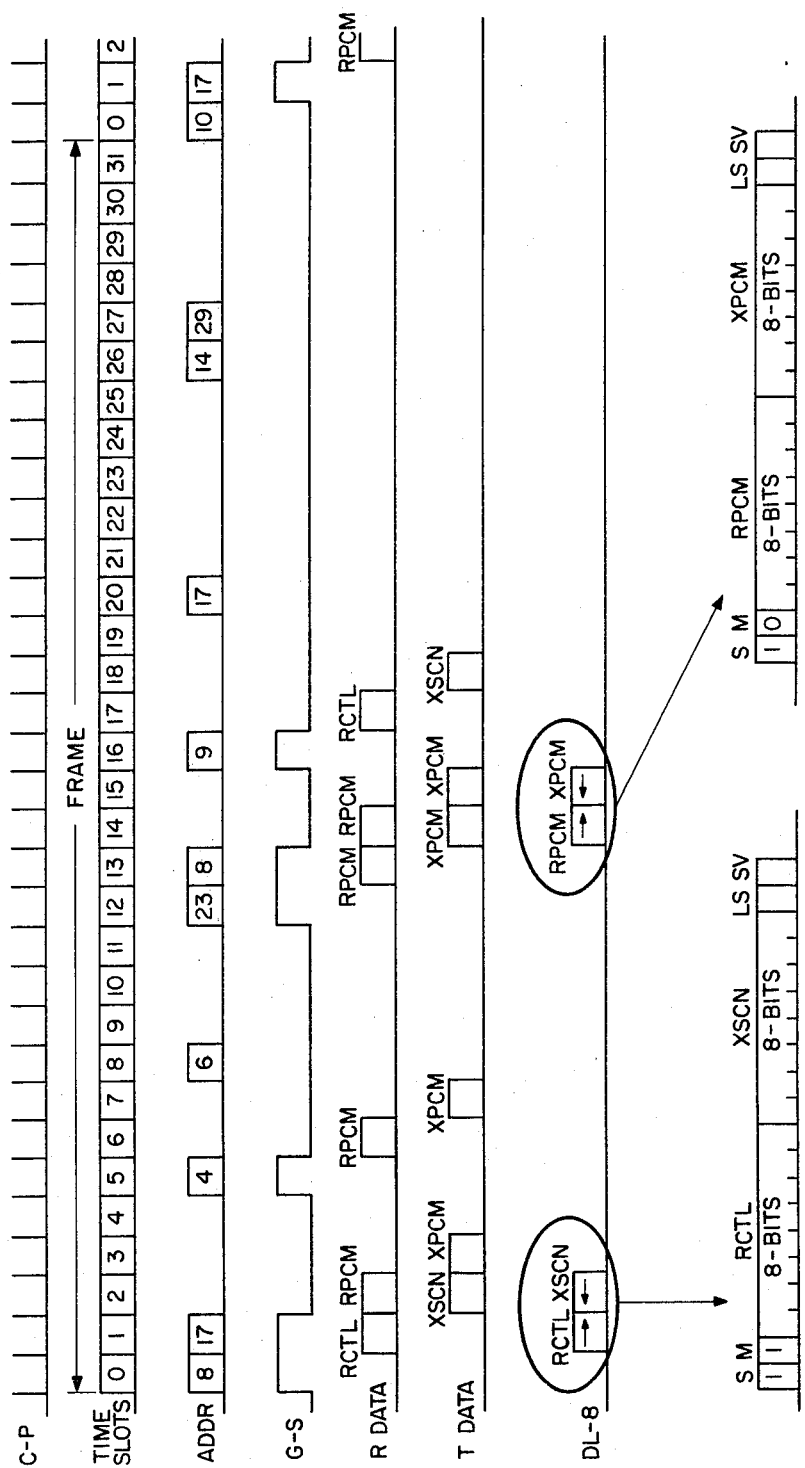
FIG. 3 illustrates various timing signals used in the network of FIG. 2.

The detailed structure of the line-group network in FIG. 2 will be readily apparent from the following detailed description of its function and operation taken in conjunction with the timing waveforms illustrated in FIG. 3, the location of which in each bus is identified by corresponding reference characters.

In FIG. 3, boxed waveforms each represent 10 bits of binary information. As mentioned above, two channel time slots 0 and 16 are utilized for supervision and control. During these periods the line circuits L-0 through L-32 are selectively scanned by controllers LMC-0 or LMC-1. The remaining channel slots 1-15 and 17-31 are available for PCM data. In this example embodiment, it is assumed that line circuits 4, 8, 17 and 23 (assigned channel time slots 5, 13, 1 and 12 by the controller) are carrying traffic in one line-group network while line circuits 6, 14, 17 and 29 (assigned time slots 8, 26, 20 and 27 by the controller) are carrying traffic in one or more of the other line-group networks, for the duration of the respective telephone calls. In addition, line circuits 8 and 9 of the said one line-group network are scanned during time slots 0 and 16 respectively of one frame, while channel 10 of another line-group network is scanned during time slot 0 of the following frame. The balance of the channels for this port are idle at this time.

The 10-bit addresses ADDR for the networks normally from their primary controller, are transmitted over buses B-0 and B-1 to serial/parallel converters 10. After a complete address is received, the parallel output of converter 10 is loaded into a receive address register 11 under control of a group select signal G-S and a channel pulse C-P (which indicates the beginning of each 10-bit channel period) during the succeeding time slot. The output of the register 11 then enables a demultiplexer 12 which then accepts the received serial data RDAT which is coupled through an AND gate 13, under control of a delayed group select signal G-S, to the signal input of the demultiplexer 12. The serial data RDAT is steered through the demultiplexer 12 to the selected data line where it is coupled to the input of the selected line circuit L-0 through L-32. In the present example, the address ADDR for channel 8 in time slot 0 in conjunction with the presence of the group select signal G-S, causes the received control data RCTL on the receive data path RDAT to be directed to the line circuit L-8 during time slot 1. Similarly, the address ADDR during time slot 1 together with G-S causes the received PCM data RPCM on the receive data path RDAT to be directed to the line circuit L-17 during time slot 2, and so on. However, the address for channel 6 which occurs during time slot 8 will not enable the demultiplexer 12 in the one group select network due to the absence of the delayed group select signal G-S at the input to the AND gate 13 (N.B.-RDATA in FIG. 3). It will however enable an alternate group-select network if the signal G-S is applied to it over another group select lead G-S as shown in FIG. 1.

At the end of time slot 1, the address in register 11 is shifted to transmit address register 14 which enables the multiplexer 15 so as to steer incoming information TDATA from the selected line circuit to the transmit data path TDAT through an AND gate 16 which is opened by the group-select signal G-S that has now been delayed two time slots. This is illustrated in FIG. 3 where the scan information XSCN from line circuit 8 is transmitted during time slot 2 over data line DL-8 and the XPCM information from line circuit 17 is transmitted over the data line DL-17 and the transmit data path TDAT during time slot 3.

The activity signal ACTV from the primary controller LMC-0 enables both the CLK and demultiplexer 12. During normal operation, different channel information is transmitted to each of the multiplexers M-0 and M-1 since they are driven by controllers LMC-0 and LMC-1 respectively, each of which acts as the primary controller for a different half of the 1280 line circuits. However, since each ACTV signal actuates only one of the multiplexers M-0 or M-1 at a time, the channel data going to the non-operating multiplexer is not transmitted through to its associated line circuits. Failure of either of the controllers LMC-0 or LMC-1 or any one of the operating multiplexers M-0 or M-1 is sensed by the other controller as well as the switching network. This causes the ACTV signal to be removed from the affected multiplexer in each of the line-group networks LG-0 through LG-39, thereby resulting in the other multiplexer of that network taking over. Concurrently the channel information for that line-group network is routed from the switching network through the secondary controller to its associated multiplexer. Hence, the line circuits L-0 through L-31 continue to function over the common data line DL. The non-operating multiplexer is monitored continuously by its associated controller through test codes sent via RDAT, TDAT, using special address codes. Detection of a failure causes an alarm for repair but no switch-over of the system.

Referring again to FIG. 3, the group-select signal G-S together with the serial address signal ADDR determines during each channel period the line to be accessed from the controller during the succeeding two time slots. Actual data (PCM or control/scan) is transmitted serially over the receive data RDAT bus to the line group and over the transmit data TDAT but to the controller. Each data exchange extends over periods of three channel time slots. In the first period, the line address is transmitted; in the second period, data is received from the controller by the line circuit; in the third period, data is transmitted from the line circuit back to the controller. Thus, during the second and third periods, the operating multiplexer M-0 or M-1 is transparent to data being transmitted or received from the selected line circuits. The access to different line circuits in successive transaction periods overlaps the time to allow effective use of all 32 channel time slots. The only restriction is that the same line not be accessed in successive channel time slots. Thus, in the example embodiment, PCM data information for channel 8 cannot be received or transmitted during time slots 1 and 2 since the control and scan information for that channel occupies these periods. To avoid overlap, even scanning/control addresses are transmitted during time slot 0 while those for PCM data for the even address lines are never transmitted during time slots 31 or 1. Odd scanning/control addresses are transmitted during time slot 16 while those for PCM data for the odd address lines are never transmitted during time slots 15 or 17. Various other arrangements are also possible.

Referring again to FIG. 2 and the expanded portions of FIG. 3, data on the data line DL-8 (not specifically shown in FIG. 2—refer to typical data line DL-1 and line circuit L-1) is received by the line control circuit 21 in the line circuit L-1 under control of the clock CLK. Each 20 bit exchange between the line circuit and the controller is initiated by a start bit S=1 (not the expanded portions of FIG. 3). This is followed by a mode bit M=1 which indicates that control/scan information will follow or M=0 which indicates that PCM information will follow. After reception of the bit M=1, 8 bits of control data RCTL are transmitted from the controller to the line control circuit 21. This information which provides control for ringing, or operation of numerous test functions, is steered to the scan and control registers 22 where it is utilized to actuate a line interface circuit 23 which is connected to the subscriber loop 24. This is followed by 8 bits of scanning information XSCN, which transmits status and dialling information from the line circuit back to the controller. Finally, line status LS and on/hook supervision SV bits are transmitted again from the line circuit during the last two bits of the exchange.

Every line, whether it is carrying traffic or not, is accessed for scanning and control once every n×5 msec; 5 msec being the basic cycle time of the controllers. The value of n depends upon the number of lines being scanned and the status of the line (supervision or dialling).

During an exchange of PCM information, the start bit S=1 and mode M=0 are followed by 8 bits of RPCM transmitted from the switching network, through the controller to the line circuit. These 8 bits are steered through the line control circuit 21 to a codec 25. The codec 25 converts the RPCM signal to analog form for transmission through the line interface circuit 23 to the subscriber loop 24. Conversely, a coded analog sample SPCM is transmitted from the codec 25 through the line circuit 21 back through the controller to the switching network. Again, line status LS and supervision SV are transmitted at the end of this data exchange to the controller. The S and T leads between the circuits 21, 22 and 25 provide start and timing information in a well known manner.

In an alternate embodiment, the channel information fed to the input ports P0-0 through P3-1 may be a duplicate of that to ports P4-0 through P7-1 respectively. With this arrangement both multiplexers M-0 and M-1 transmit and receive the same information although at any point in time only one of any pair is activated by the ACTV signal.

In yet another embodiment, several telephone line circuits (e.g. 4) may be served by a single bidirectional data line with all lines in a line-group network (e.g. 32) being accessed in a fixed sequence, from the multiplexer. All line circuits on the single data line are accessed in sequence so that only a single synchronizing pulse (one per frame) is required in addition to a clock signal, to identify the start of the sequence.

With this arrangement failure of one line circuit could render unserviceable the balance of the line circuits (e.g. the other 3) coupled to its associated bidirectional data line. However, the balance of the lines in the line-group network would be unaffected.

What is claimed is:

1. A digital communication bus system comprising:
 first and second line-module controllers for controlling respective first and second multiplexers in each of a plurality of line-group networks;
 each of the first and second controllers including means for transmitting consecutive time-division multiplexed addresses received over an address signal path to, and for transmitting and receiving time-division multiplexed data over respective receive and transmit signal paths to and from each of the respective first and second multiplexers in corresponding iterated time slots of a frame;
 characterized by:
 each of the line-group networks including a plurality of line circuits, each of which couples an individual telephone line to a separate bidirectional data line that is connected in common to the first and second multiplexers;
 each of the multiplexers including means for decoding each of said addresses, and means responsive to each decoded address for steering data received over the receive signal path from the controller to the associated line circuit over its separate bidirectional data line, and for steering data received from the associated line circuit over its separate data line to the transmit signal path in the two time slots succeeding its address; and
 means responsive to a control signal from the first line-module controller for actuating one or the other of said first or second multiplexers.

2. A bus system as defined in claim 1 in which each line circuit receives control data and transmits status data from and to one of the line module controllers on a sequential basis in one of at least two selected time slots of each frame;
 in which each active line circuit receives and transmits information data from and to said one of the line-module controllers via the associated multiplexer in another selected time slot of every frame; and
 in which the time slot of the address controlling the information data for a line circuit does not immediately precede or follow the address controlling the control and status data for that line circuit.

3. A bus system as defined in claim 2 in which a separate group select control signal is transmitted to each line-group network concurrently with the transmission of an address for that network; and
 each multiplexer includes:
 means for delaying the group select control signal by one time slot to gate the data received over the receive signal path; and
 means for delaying the group select control signal by another time slot to gate the data transmitted over the transmit signal path.

4. A digital communication bus system comprising:
 first and second multiplexers, each of the multiplexers including means for decoding consecutive time-division multiplexed addresses received over an address signal path, and for receiving and transmitting time-division multiplexed data over respective receive and transmit signal paths in corresponding iterated time slots of a frame;

a plurality of line circuits;

characterized by:

each of said line circuits coupling at least one telephone line to a separate bidirectional data line that is connected in common to the first and second multiplexers;

each of the multiplexers including means responsive to each decoded address for steering data received over the receive signal path to the associated line circuit over its separate bidirectional data line, and for steering data received from the associated line circuit over its separate bidirectional data line to the transmit signal path in the two time slots succeeding its address; and means responsive to a control signal for actuating one or the other of said first or second multiplexers.

* * * * *